United States Patent
Hall et al.

(10) Patent No.: US 8,421,287 B2
(45) Date of Patent: Apr. 16, 2013

(54) DOWNHOLE TORODIAL GENERATOR WITH CENTRAL PASSAGE

(76) Inventors: David R. Hall, Provo, UT (US); Scott S. Dahlgren, Alpine, UT (US)

(*) Notice: Subject to any disclaimer, the term of this patent is extended or adjusted under 35 U.S.C. 154(b) by 416 days.

(21) Appl. No.: 12/767,332

(22) Filed: Apr. 26, 2010

(65) Prior Publication Data

US 2011/0260457 A1    Oct. 27, 2011

(51) Int. Cl.
*H02K 21/12* (2006.01)
*H02K 21/18* (2006.01)

(52) U.S. Cl.
USPC .............................. 310/87; 310/85; 310/164

(58) Field of Classification Search .............. 310/87, 310/85, 216.023, 216.033, 216.039, 216.074, 310/216.077, 216.091, 216.094; *H02K 21/12, H02K 21/14, 21/18*
See application file for complete search history.

(56) References Cited

U.S. PATENT DOCUMENTS

| | | |
|---|---|---|
| RE30,055 E | 7/1979 | Claycomb |
| 4,211,291 A | 7/1980 | Kellner |
| 4,217,511 A * | 8/1980 | King et al. ............ 310/55 |
| 4,462,469 A | 7/1984 | Brown |
| 4,676,310 A | 6/1987 | Scherbatskoy et al. |
| 4,721,172 A | 1/1988 | Brett et al. |
| 5,098,258 A | 3/1992 | Barnetche-Gonzalez |
| 5,164,626 A * | 11/1992 | Oigawa ............ 310/216.033 |
| 5,626,200 A * | 5/1997 | Gilbert et al. ............ 175/40 |
| 5,806,169 A * | 9/1998 | Trago et al. ............ 310/216.094 |
| 5,839,508 A | 11/1998 | Tubel et al. |
| 6,127,750 A * | 10/2000 | Dadd ............ 310/13 |
| 6,211,595 B1 * | 4/2001 | Nose ............ 310/216.077 |
| 6,495,929 B2 | 12/2002 | Bosley et al. |
| 6,830,107 B2 | 12/2004 | Allen |
| 6,840,327 B2 | 1/2005 | Mitchell |
| 6,899,188 B2 | 5/2005 | Hughes et al. |
| 7,424,922 B2 | 9/2008 | Hall et al. |
| 7,624,821 B1 | 12/2009 | Hall et al. |
| 2004/0251761 A1 * | 12/2004 | Hirzel ............ 310/156.25 |
| 2006/0082237 A1 * | 4/2006 | Kerlin ............ 310/166 |
| 2011/0259639 A1 * | 10/2011 | Hall et al. ............ 175/40 |

* cited by examiner

*Primary Examiner* — Tran Nguyen
*Assistant Examiner* — Michael Andrews
(74) *Attorney, Agent, or Firm* — Philip W. Townsend, III (57) ABSTRACT

What is claimed is a downhole tool string component comprising a generator. The generator may comprise a toroidal stator comprising an interior channel formed between inward extending stator poles. A coil of wire is disposed within the interior channel, and a plurality of magnets are rotatably disposed proximate each pole.

A downhole tool string component comprises a bore to receive a flow of drilling fluid comprising a central passage and at least one peripheral passage. A compliant member is disposed within the bore and forms an internal diameter of the central passage, and at least one opening. The at least one opening comprises an internal area within the compliant member to divert the flow of drilling fluid into the at least one peripheral passage. The compliant member comprises a compliant property allowing the internal area of the at least one opening to change thus changing the amount of diverted drilling fluid.

17 Claims, 12 Drawing Sheets

| Providing a bore comprising a central passage and at least one peripheral passage, a compliant member disposed within the bore and forming an internal diameter of the central passage, and at least one opening, comprising an internal area, within the compliant member, wherein the compliant member comprises a compliant property 1001 |

| Passing drilling fluid through the bore 1002 |

| Separating the drilling fluid between the central passage and the at least one peripheral passage by passing a portion of the drilling fluid through the at least one opening and past the turbine 1003 |

| Flexing the compliant member to alter the internal area of the at least one opening thus varying the amount of flow of drilling fluid being separated 1004 |

Fig. 10

| Providing a toroidal stator comprising an interior channel formed between inward extending stator poles and a coil of wire disposed within the interior channel |
|---|
| 1101 |

| Rotating a plurality of magnets disposed proximate each stator pole of around a central axis shared by the toroidal stator, coil of wire and plurality magnets |
|---|
| 1102 |

DOWNHOLE TORODIAL GENERATOR WITH CENTRAL PASSAGE

BACKGROUND OF THE INVENTION

The present invention relates to downhole drilling assemblies, specifically downhole drilling assemblies for use in oil, gas, geothermal, and horizontal drilling. The ability to efficiently provide a power source downhole is desirable to electronically and mechanically power downhole instrumentation. The following patents attempt to solve the problem of generating electricity downhole.

U.S. Pat. No. 5,626,200 to Gilbert et al., which is herein incorporated by reference for all that it contains discloses a logging-while-drilling tool for use in a wellbore in which the tool includes an alternator for providing power to the electronics, and a turbine for driving the alternator. The turbine blades are driven by the well fluid introduced into the hollow drill string. The tool also includes a deflector to deflect a portion of the well fluid away from the turbine blades.

U.S. Pat. No. 5,839,508 to Tubel et al., which is herein incorporated by reference for all that it contains, discloses an electrical generating apparatus which connects to the production tubing. In a preferred embodiment, this apparatus includes a housing having a primary flow passageway in communication with the production tubing. The housing also includes a laterally displaced side passageway communicating with the primary flow passageway such that production fluid passes upwardly towards the surface through the primary and side passageways. A flow diverter may be positioned in the housing to divert a variable amount of the production fluid from the production tubing and into the side passageway. In accordance with an important feature of this invention, an electrical generator is located at least partially in or along the side passageway. The electrical generator generates electricity through the interaction of the flowing production fluid.

U.S. Pat. No. 7,624,821 to Hall et al., which is herein incorporated by reference for all it contains, discloses a downhole tool string component with a bore adapted to accommodate drilling mud having a central passage and at least one periphery passage. At least two movable segments are peripherally positioned around a bore wall adapted to constrict a diameter of the central passage and are adapted to divert drilling mud into the at least one periphery passage. At least one opening mechanism is adapted to move a portion of the at least two movable segments toward the bore wall. Debris in the drilling fluid may get lodged in the movable parts and hinges of this invention thereby impairing the normal function of the movable segments.

BRIEF SUMMARY OF THE INVENTION

In various embodiments of the present invention a downhole tool string component may comprise a generator. The generator may comprise a toroidal stator comprising an interior channel formed between inward extending stator poles. A coil of wire may be disposed within the interior channel, and a plurality of magnets may be rotatably disposed proximate each pole.

In other embodiments the inward extending stator poles of the generator are paired with mating stator poles on opposing sides of the interior channel. A plurality of slots may circumferentially separate and/or evenly space the inward extending stator poles. The inward extending stator poles may comprise a plurality of layers normal to the toroidal stator that may be evenly spaced apart from each other. The plurality of layers may be spaced apart by air or the plurality of layers may be separated by potting material.

In other embodiments the coil of wire may comprise a steel interior surrounded by a copper coating, further surrounded by a gold, a silver or a nickel coating. The coil of wire may be enclosed in PEEK. The coil of wire may be potted within the interior channel.

In other embodiments the plurality of magnets may be permanent magnets. The plurality of magnets may comprise two series of magnets disposed proximate mating stator poles on opposing sides of the interior channel. The mating magnets of the plurality of magnets corresponding with mating stator poles may comprise opposite polarity. Adjacent magnets of the plurality of magnets may comprise opposite polarity. The plurality of magnets may be secured around the perimeter of a rotatable conduit. The rotatable conduit may shield the toroidal stator, coil of wire, and plurality of magnets from a flow of drilling fluid. The rotatable conduit may be rotated by a turbine.

In one embodiment of the present invention a method of converting rotational energy into electrical energy comprises rotating the plurality of magnets disposed proximate each pole around a central axis shared by the toroidal stator, coil of wire and plurality of magnets. The act of rotating the plurality of magnets may be performed by passing drilling fluid past a turbine that rotates a rotatable conduit that secures the plurality of magnets proximate each pole then channeling the drilling fluid into the rotatable conduit after it passes the turbine.

In various embodiments of the invention a downhole tool string component comprises a bore to receive a flow of drilling fluid comprising a central passage and at least one peripheral passage. A compliant member may be disposed within the bore and forms an internal diameter of the central passage, and at least one opening. The at least one opening comprises an internal area within the compliant member to divert the flow of drilling fluid into at least one peripheral passage. The compliant member comprises a compliant property allowing the internal area of at least one opening to change thus changing the amount of flow of drilling fluid being diverted. The downhole tool string may be in communication with a telemetry system.

In another embodiment of the present invention the at least one peripheral passage may direct drilling fluid to a turbine. The at least one peripheral passage may direct drilling fluid to the central passage after passing a turbine. The turbine may be in communication with an electrical generator.

In another embodiment of the present invention the bore may comprise a varying internal diameter to alter a pressure in the peripheral passage. The changing of the internal area of the at least one opening may be due to a pressure differential between the peripheral and central passage. The at least one opening may constrict in a direction of the flow of drilling fluid.

In another embodiment of the present invention the compliant property may comprise a modulus of elasticity range of 100 ksi to 90 Msi. The compliant member may comprise rubber with a metal support, metal, composite, fiberglass, Kevlar carbon fiber, ceramic, boron carbide, alumina, aluminum silicate or combinations thereof. The composite may comprise a matrix material which may comprise epoxy, PEEK, Teflon, plastic, rubber, silicon rubber or combinations thereof. The at least one opening of the compliant member may comprise a helical pattern along the compliant member. The at least one opening may comprise a slit. The slit may comprise a width that fluctuates as the internal area of the at least one opening changes. The slit may comprise opposing sides comprising a pointed side and a notched side to receive the pointed side such that the opposing sides interlock. The compliant member may comprise a single piece. The compliant member may comprise a homogeneous material. The compliant member may comprise a central diameter smaller than an end diameter of the compliant member.

In another embodiment of the present invention a method of diverting drilling fluid to a turbine comprises passing drilling fluid through the bore, separating the drilling fluid between the central passage and the at least one peripheral passage by passing a portion of the drilling fluid through the at least one opening and past the turbine, and flexing the compliant member to alter the internal area of the at least one opening thus varying the amount of flow of drilling fluid being separated.

The flexing may be caused by a pressure differential between the central passage and the at least one peripheral passage.

DETAILED DESCRIPTION OF THE INVENTION AND THE PREFERRED EMBODIMENT

Figure 1:
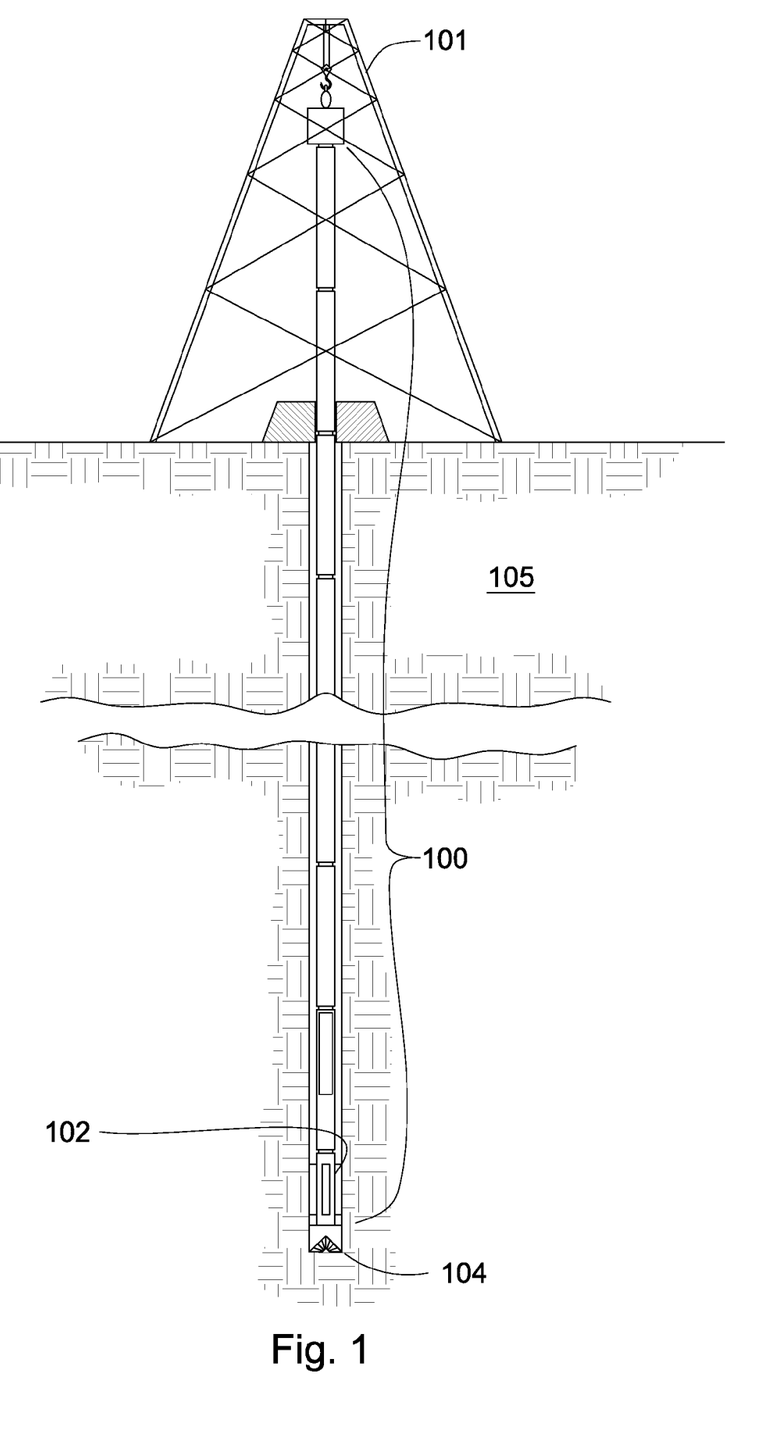
FIG. 1 is a cutaway view of an embodiment of a downhole drill string.

Moving now to the figures, FIG. 1 displays a cutaway view of an embodiment of a downhole drill string 100 suspended from a drill rig 101. A downhole assembly 102 may be located at some point along the drill string 100 and a drill bit 104 may be located at the end of the drill string 100. As the drill bit 104 rotates downhole the drill string 100 may advance farther into soft or hard earthen formations 105. The downhole assembly 102 and/or downhole components may comprise data acquisition devices which may gather data. Further, surface equipment may send data and/or power to downhole tools and/or the downhole assembly 102.

Figure 2:
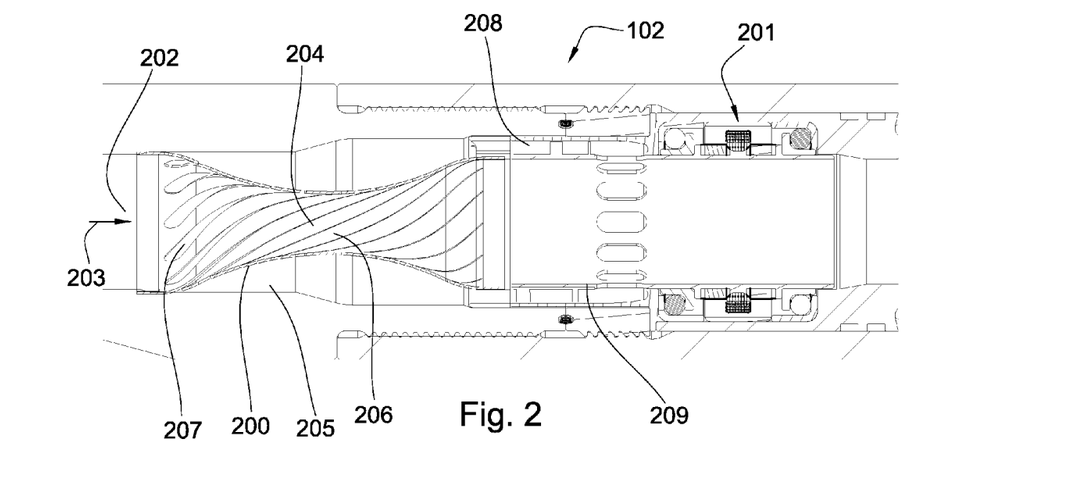
FIG. 2 is a longitudinal section view of an embodiment of a drill string component comprising a compliant member and a generator.

FIG. 2 is a longitudinal section view of an embodiment of a drill string component 102 comprising a compliant member 200 and a generator 201. The drill string component 102 may comprise a bore 202 to receive a flow of drilling fluid 203 comprising a central passage 204 and at least one peripheral passage 205. The drill string component 102 may comprise a compliant member 200 disposed within the bore 202 and may form an internal diameter 206 of the central passage 204. At least one opening 207, within the compliant member 200, may comprise an internal area. The opening 207 may further comprise a helical pattern and/or may constrict in a direction of the flow of drilling fluid 203. The opening 207 in the compliant member 200 may divert the flow of drilling fluid 203 to the peripheral passage 205. The diverted fluid in the peripheral passage 205 may be directed to a turbine 208 causing a rotatable conduit 209 to rotate. The turbine 208 may be in communication with a generator 201.

The compliant member 200 may comprise a compliant property allowing the internal area of the at least one opening 207 to change thus changing the amount of drilling fluid being diverted. It is anticipated that a pressure differential between the peripheral 205 and central 204 passages may be due to the increased fluid velocity in the central passage 204. A greater pressure in the peripheral passage 205 than the central passage 204 may cause the compliant member 200 to flex. As the compliant member 200 flexes, it may cause an internal area of the at least one opening 207 to change, thus regulating the amount of fluid diverted to the peripheral passage 205.

When the flow of drilling fluid 203 is flowing through the compliant member 200 it is anticipated that the internal diameter 206 will constrict due to a pressure difference between the peripheral passage 205 and central passage 204. The compliant property of the compliant member 200 may prevent the collapse of the central portion of the compliant member 200 when the internal diameter 206 changes.

Figures 3A, 3B:
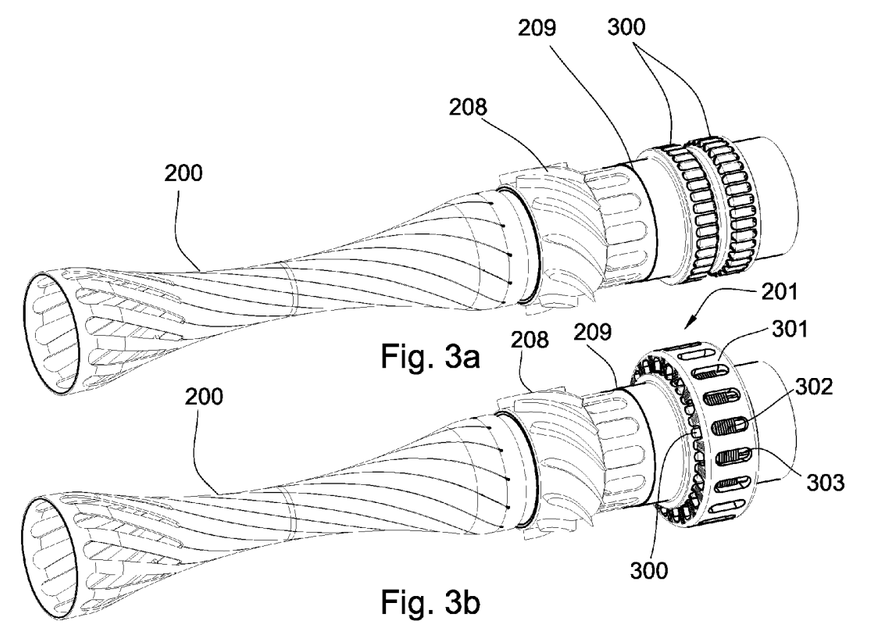
FIG. 3a is a perspective view of an embodiment of a compliant member and a turbine.
FIG. 3b is a perspective view of an embodiment of a compliant member, turbine and an axial flux generator.

FIG. 3a is a perspective view of an embodiment of a compliant member 200 and a turbine 208. A plurality of magnets 300 may be secured around the perimeter of the rotatable conduit 209 allowing the rotatable conduit 209 and plurality of magnets 300 to rotate simultaneously as drilling fluid flows past the turbine 208.

FIG. 3b is a perspective view of an embodiment of a compliant member 200, a turbine 208 and a generator 201. A toroidal stator 301 may be positioned proximate the rotatable conduit 209 comprising the plurality of magnets 300. The rotation of the plurality of magnets 300 may create a changing magnetic field in the toroidal stator 301. The changing magnetic field may induce an electrical current in a coil of wire 302 disposed within an internal channel 303 of the toroidal stator 301.

Figure 4:
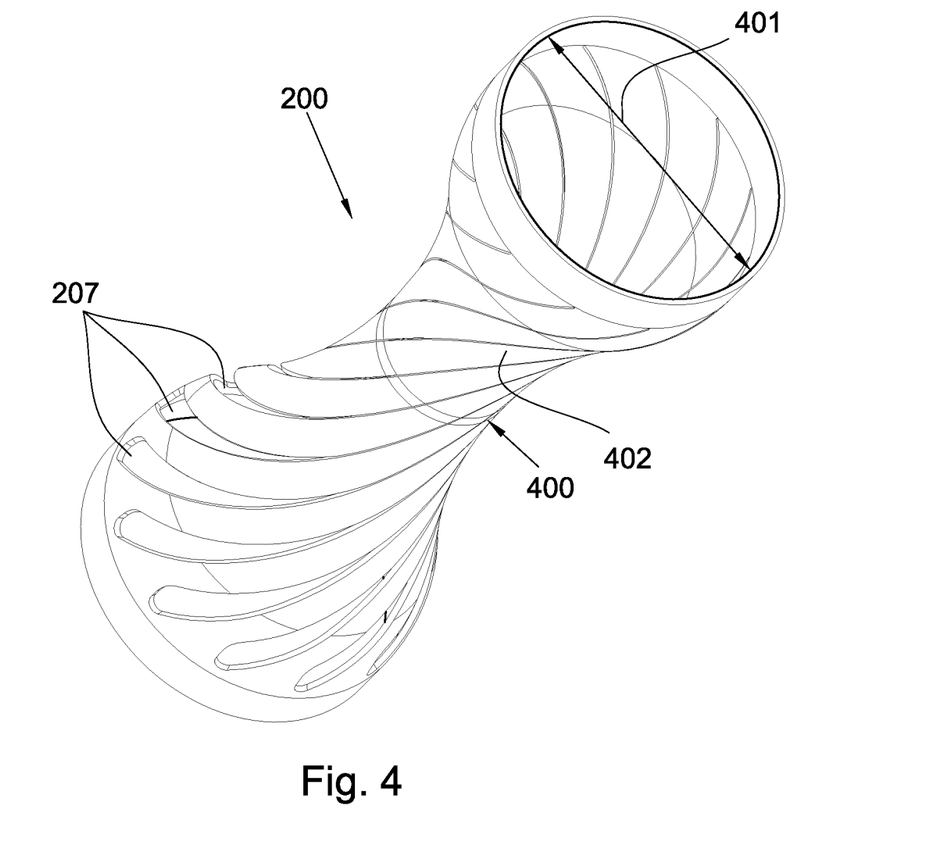
FIG. 4 is a perspective view of an embodiment of a compliant member.

FIG. 4 is a perspective view of an embodiment of a compliant member 200. The opening 207 may comprise a helical pattern along the compliant member 200. The opening 207 may comprise a slit 402 with a width that fluctuates as the internal area of the opening 207 changes.

The compliant member 200 may comprise rubber with a metal support, metal, composite, fiberglass, Kevlar carbon fiber, ceramic, boron carbide, alumina, aluminum silicate or combinations thereof. The composite may comprise a matrix material that may comprise epoxy, PEEK, Teflon, plastic, rubber, silicon rubber or combinations thereof. The compliant member 200 may comprise a single piece. The compliant member 200 may comprise a homogeneous material. The material used to make the compliant member 200 may affect the compliant property of the compliant member 200. The compliant property may comprise a modulus of elasticity range of 100 ksi to 90 Msi. The compliant member 200 may comprise an internal diameter 206 smaller than an end diameter 401 of the compliant member 200.

Figure 5A:
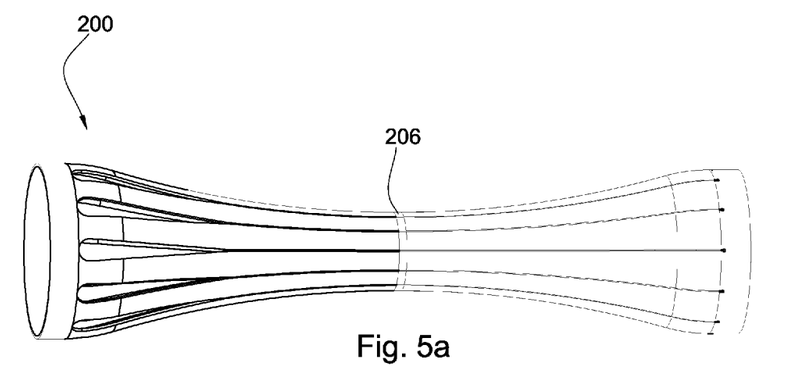
FIG. 5a is a perspective view of another embodiment of a compliant member.

FIG. 5a is a perspective view of another embodiment of a compliant member 200. The compliant property of the compliant member 200 may allow the member to flex. This flexing may cause the internal diameter 206 of the compliant member 200 to change.

Figure 5B:
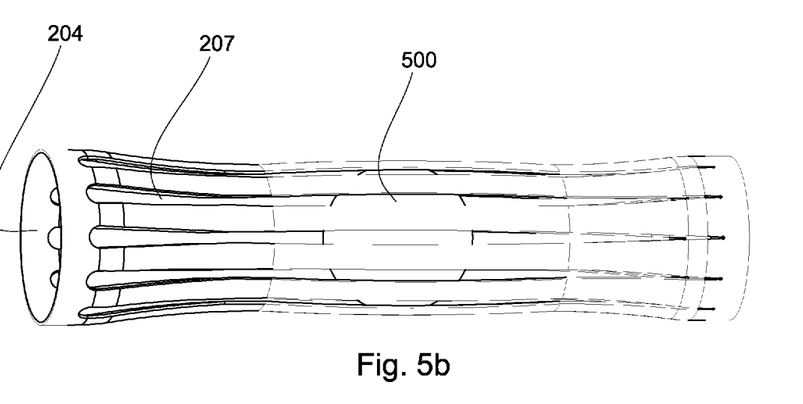
FIG. 5b is a perspective view of another embodiment of a compliant member.

FIG. 5b is a perspective view of another embodiment of a compliant member 200. A drill string instrument 500 may be sent down a tool string and pass through the central passage 204 of the compliant member 200. The instrument 500 may be attached to a string making it possible to raise and lower the instrument 500 in the tool or it may be unattached. An instrument 500 that is larger than the internal diameter 206 may be passed through the central passage 204 due to the flexing of the compliant member 200. The internal area of the openings 207 may increase as the large instrument 500 passes through the central passage 204. When the instrument 500 has passed through the compliant member 200 it may return to its original shape.

The helical pattern, as shown in FIG. 4, may prevent string wear when an instrument 500 is sent down the bore 202 through the central passage 204 of the compliant member 200. If an instrument 500 and string were passed through a compliant member 200 with openings as shown in FIGS. 5a and 5b then the string may get lodged in the openings 207 and wear more easily.

Figure 6:
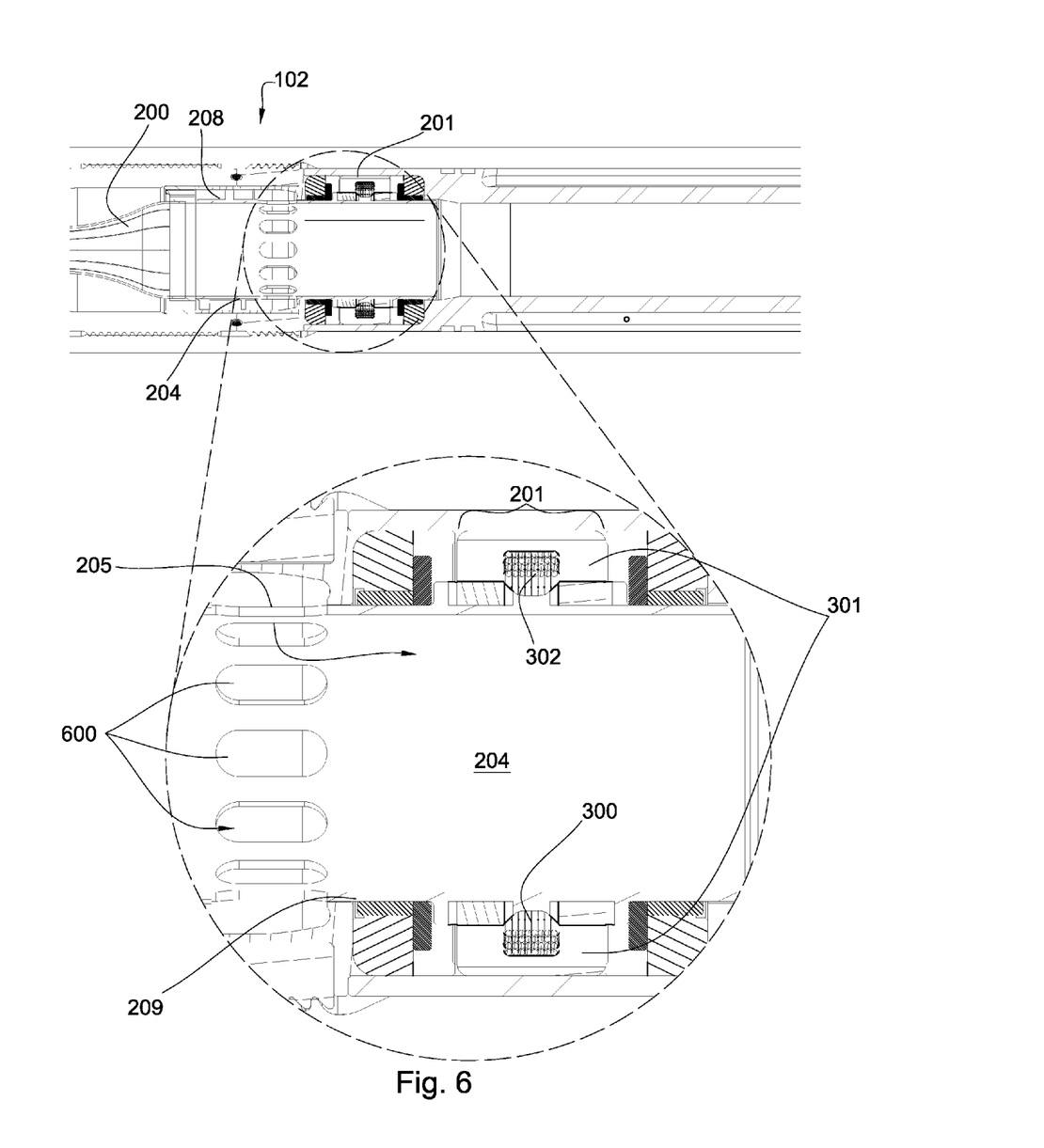
FIG. 6 is a close-up longitudinal section view of an embodiment of a drill string component comprising a compliant member and an axial flux generator.

FIG. 6 is a close-up longitudinal section view of an embodiment of a drill string component 102 comprising a compliant member 200 and an axial flux generator 201. In the present invention it may be important that the generator 201 avoid contact with drilling fluid. Drilling fluid in the peripheral passage 205 may be directed into the central passage 204 through openings 600 in the rotatable conduit 209 after passing the turbine 208. The rotatable conduit 209 may shield the toroidal stator 301, coil of wire 302, and plurality of magnets 300 from the drilling fluid.

Figure 7:
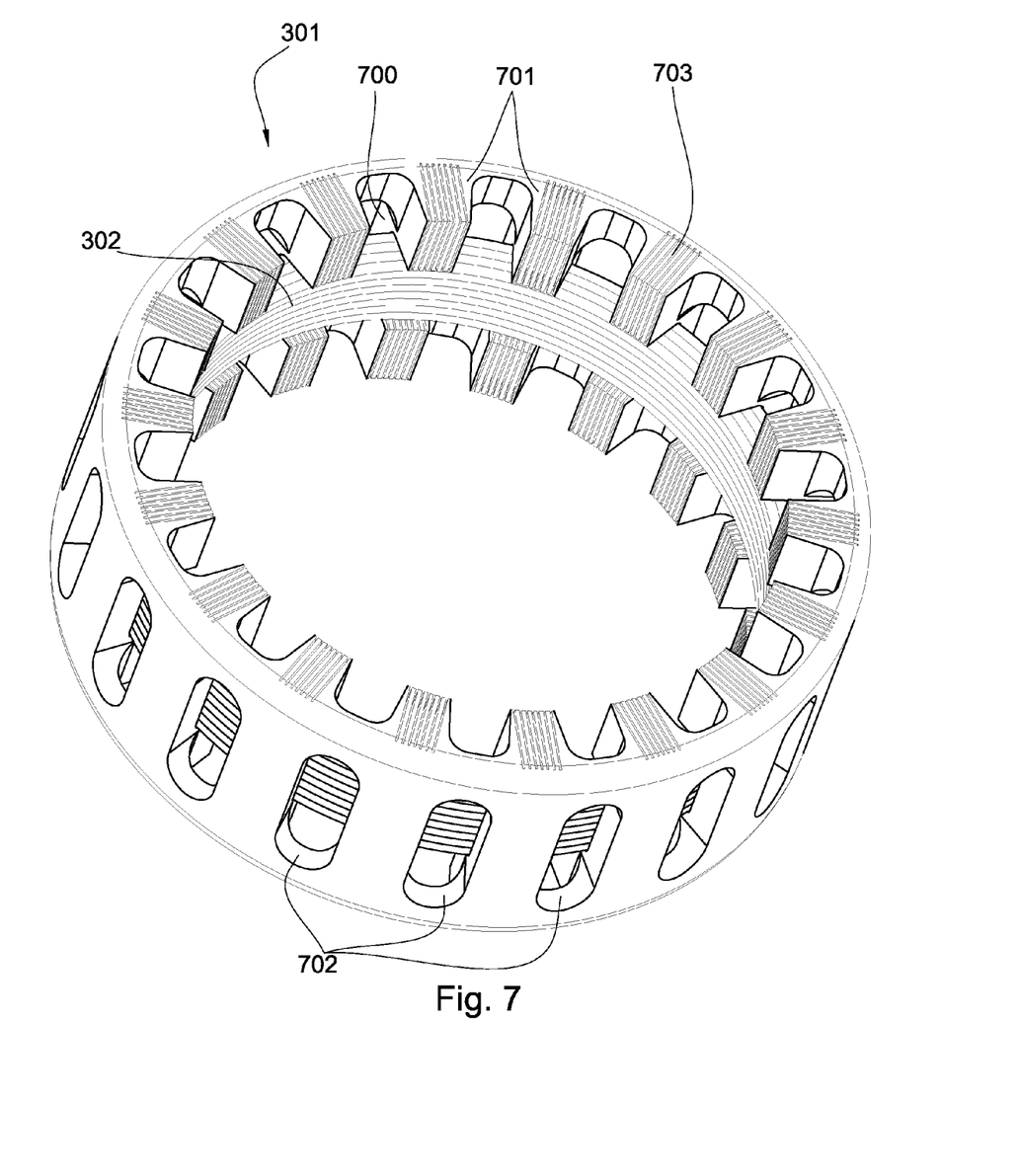
FIG. 7 is a perspective view of an embodiment of a toroidal stator.

FIG. 7 is a perspective view of an embodiment of a toroidal stator 301. The toroidal stator 301 may comprise an interior channel 700 formed between inward extending stator poles 701. The inward extending stator poles 701 may be paired with mating stator poles on opposing sides of the interior channel 700. The inward extending stator poles 701 may be circumferentially separated by a plurality of slots 702. The inward extending stator poles 701 may be evenly spaced by a plurality of matching slots 702. The inward extending stator poles 701 may comprise a plurality of layers 703 normal to the toroidal stator 301 and evenly spaced apart from each other. The plurality of layers 703 may be spaced apart by air or potting material.

A coil of wire 302 may be disposed within the interior channel 700. The coil of wire 302 may comprise a steel interior surrounded by a copper coating, further surrounded by a gold, a silver or a nickel coating. The coil of wire 302 may be enclosed in PEEK. The coil of wire 302 may be potted within the interior channel 700.

Figure 8:
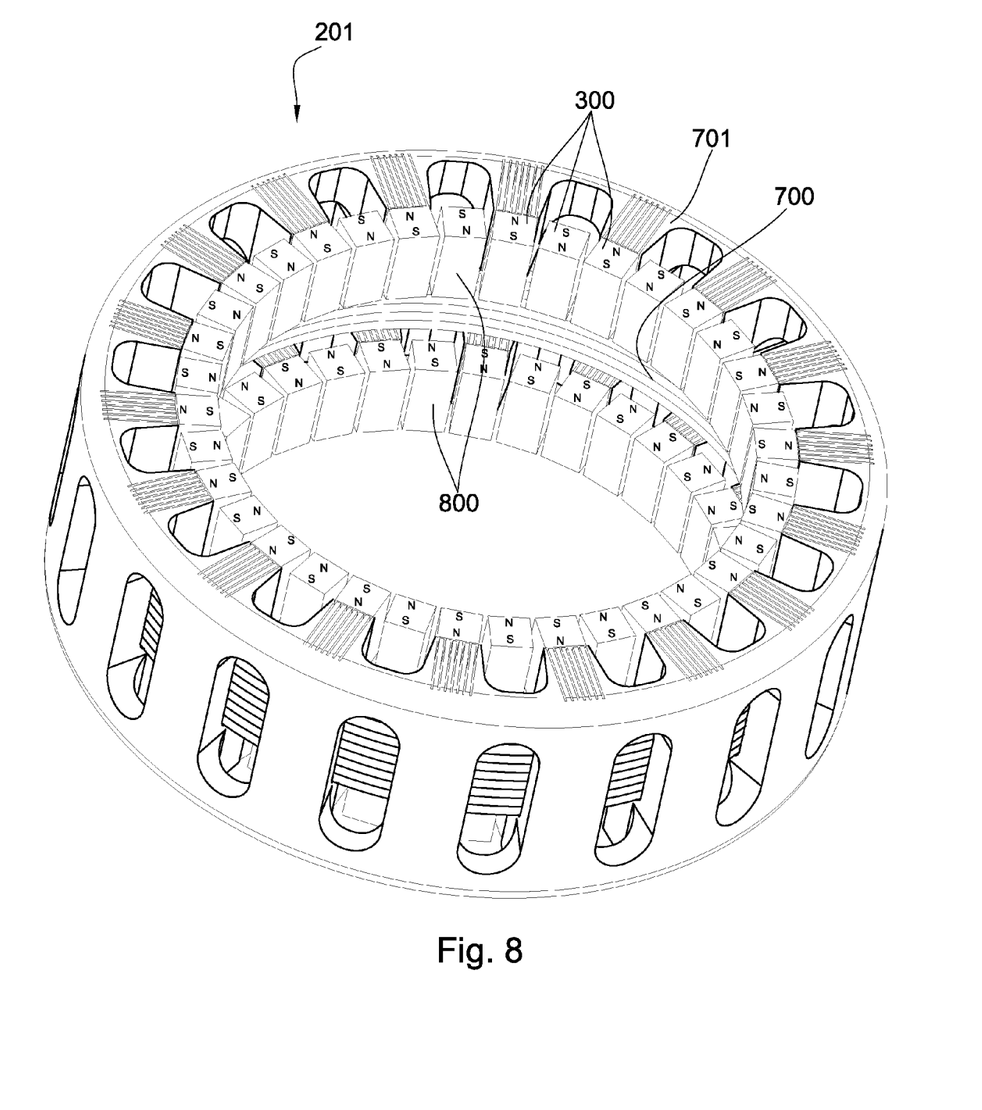
FIG. 8 is a perspective view of an embodiment of an axial flux generator.

FIG. 8 is a perspective view of an embodiment of a generator 201. In the embodiment shown the generator 201 comprises an axial flux generator. A plurality of magnets 300 may be rotatably disposed proximate each stator pole 701. The plurality of magnets 300 may be permanent magnets. The plurality of magnets 300 may comprise two series of mating magnets 800 disposed proximate mating stator poles 701 on opposing sides of the interior channel 700. The mating magnets 800 of the plurality of magnets 300 corresponding with mating stator poles 701 may comprise opposite polarity. Adjacent magnets of the plurality of magnets 300 may comprise opposite polarity.

Figure 9:
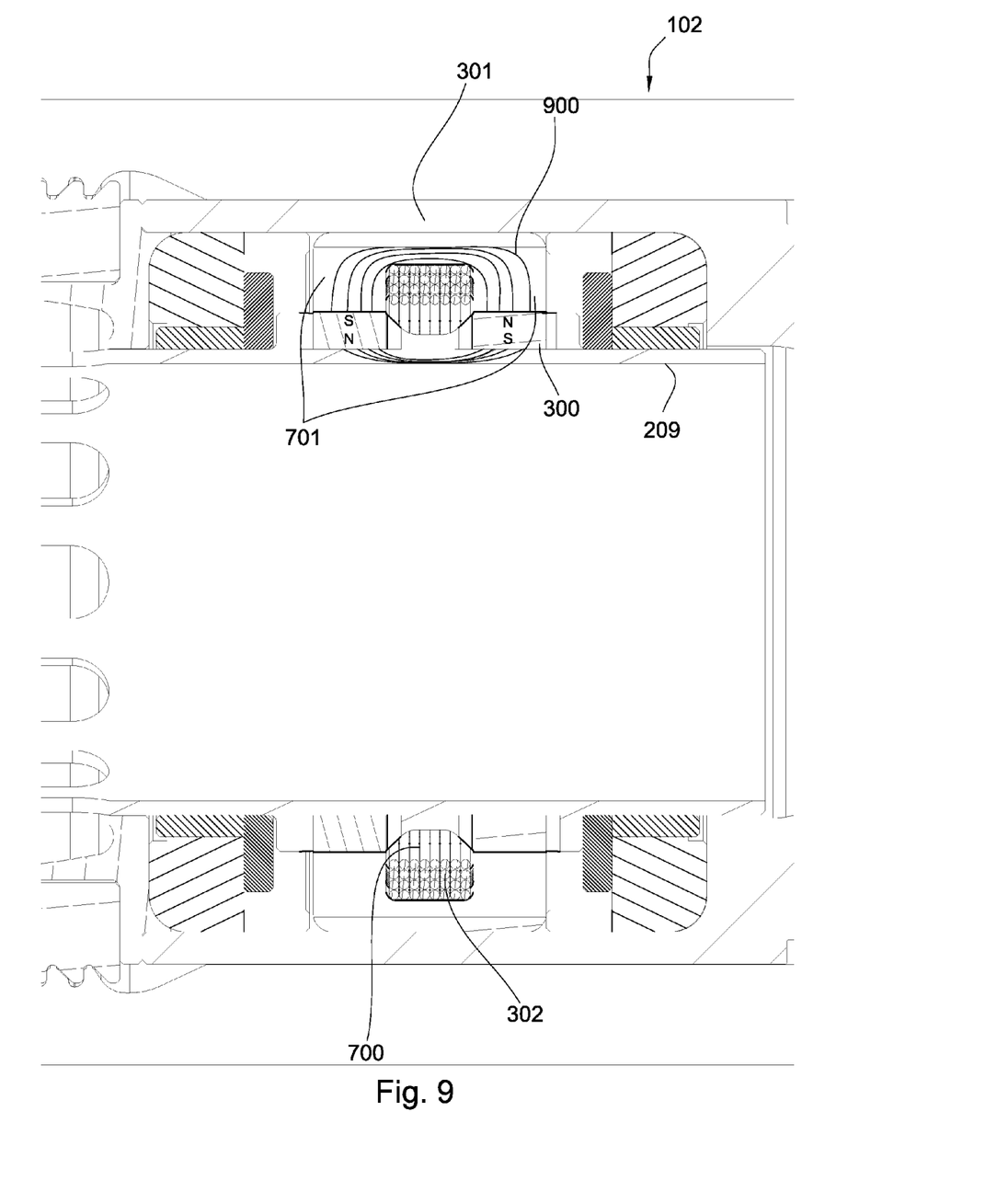
FIG. 9 is a longitudinal section view of an embodiment of a drill string component.

FIG. 9 is a longitudinal section view of an embodiment of a drill string component 102. The opposite polarity of the plurality of magnets 300 proximate mating stator poles 701 allows the magnetic field 900 to travel through the stator 301 around the coil of wire 302. As the rotatable conduit 209 rotates the opposite polarity of adjacent magnets results in a change in the magnetic field 900 in the toroidal stator 301. The changing magnetic field 900 induces a current in the coil of wire 302 in the interior channel 700 of the toroidal stator 301.

Figure 10:
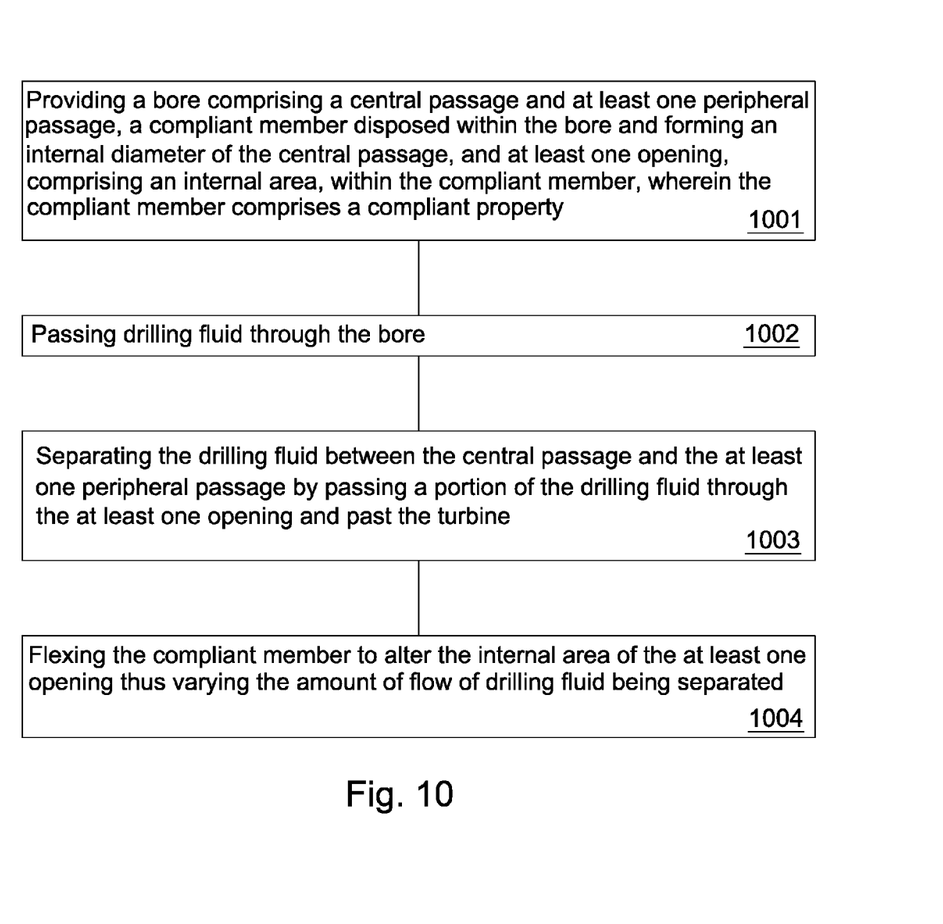
FIG. 10 is a flow chart of a method for diverting drilling fluid.

FIG. 10 is a flow chart of a method for diverting drilling fluid. The first step in the method may comprise providing a bore comprising a central passage and at least one peripheral passage, a compliant member disposed within the bore and forming an internal diameter of the central passage, and at least one opening, comprising an internal area, within the compliant member, wherein the compliant member comprises a compliant property 1001. The following steps may comprise passing drilling fluid through the bore 1002, separating the drilling fluid between the central passage and the at least one peripheral passage by passing a portion of the drilling fluid through the at least one opening and past the turbine 1003, and flexing the compliant member to alter the internal area of the at least one opening thus varying the amount of flow of drilling fluid being separated 1004. The flexing may be caused by a pressure differential between the central passage and the at least one peripheral passage.

Figure 11:
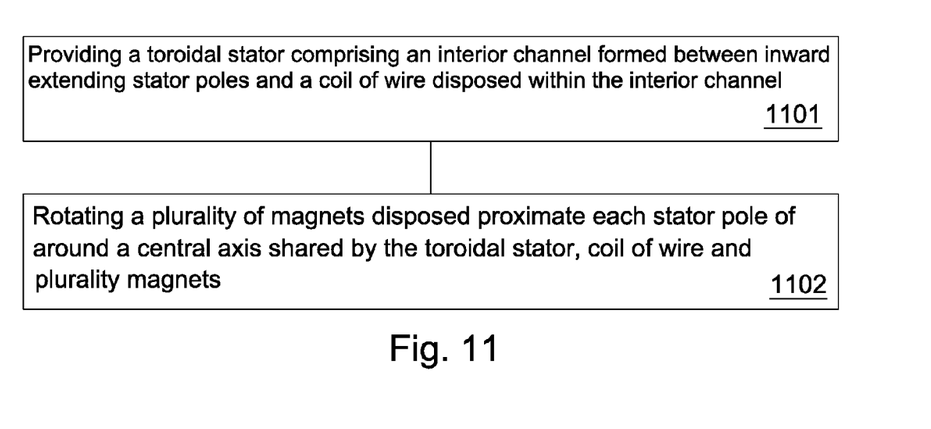
FIG. 11 is a flow chart of a method of converting rotational energy into electrical energy.

FIG. 11 is a flow chart of a method of converting rotational energy into electrical energy. The method may comprise providing a toroidal stator comprising an interior channel formed between inward extending stator poles and a coil of wire disposed within the interior channel 1101 then rotating a plurality of magnets disposed proximate each stator pole around a central axis shared by the toroidal stator, coil of wire and plurality of magnets 1102. The rotating the plurality of magnets may comprise passing drilling fluid past a turbine that rotates a rotatable conduit that secures the plurality of magnets proximate each stator pole. The method may further comprise channeling the drilling fluid into the rotatable conduit after it passes the turbine.

Figure 12:
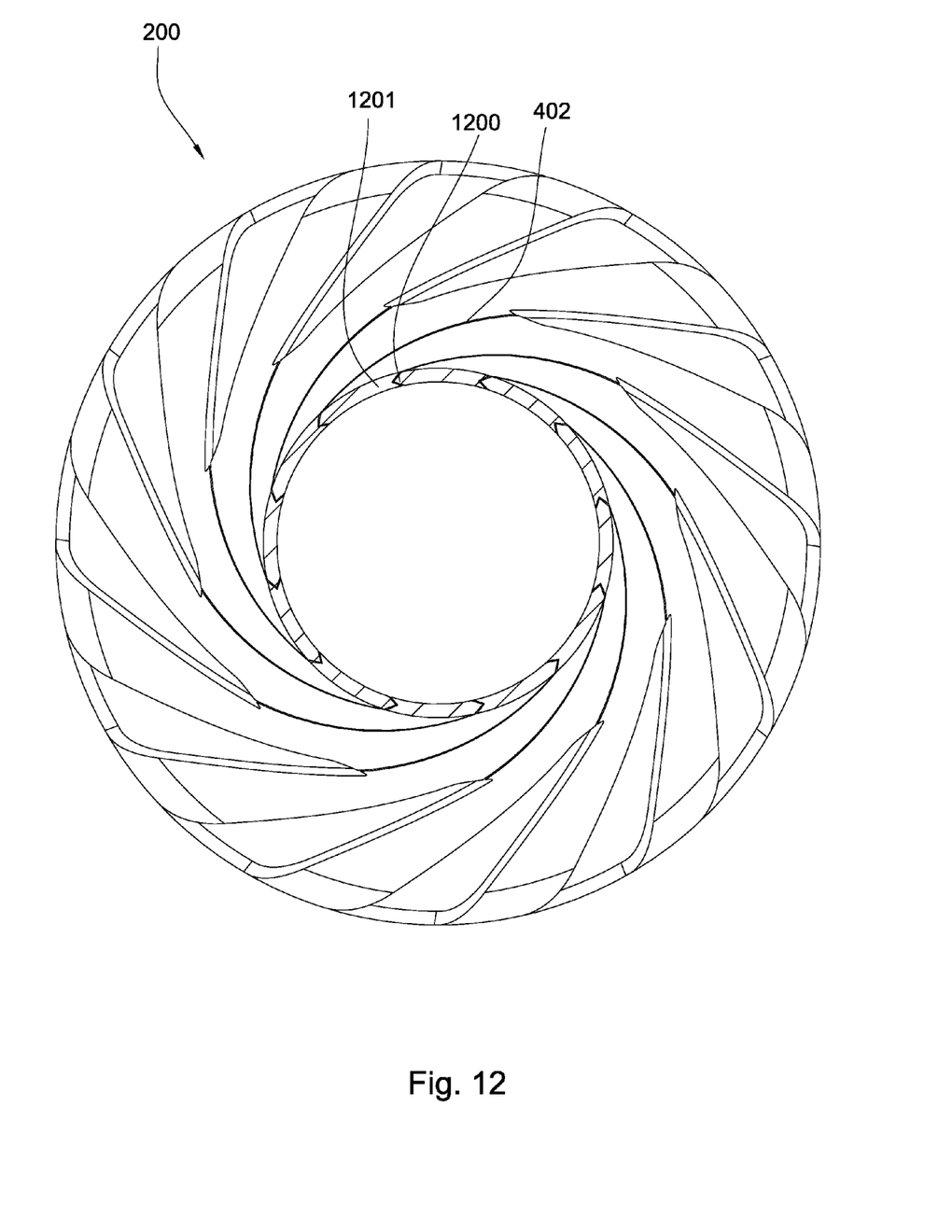
FIG. 12 is a cross-sectional diagram of an embodiment of a compliant member.

FIG. 12 is a cross-sectional diagram of an embodiment of a compliant member 200. The slit 402 may comprise opposing sides comprising a pointed side 1200 and a notched side 1201 to receive the pointed side 1200 such that the opposing sides interlock. It is anticipated that as the opposing sides interlock the constriction of the compliant member 200 may be more stable.

Whereas the present invention has been described in particular relation to the drawings attached hereto, it should be understood that other and further modifications apart from those shown or suggested herein, may be made within the scope and spirit of the present invention.

What is claimed is:
1. A generator, comprising:
a toroidal stator comprising an interior channel formed between inward extending stator poles;
a coil of wire disposed within the interior channel;
a rotatable conduit extending through the toroidal stator; and
a plurality of magnets secured around a perimeter of the rotatable conduit and rotatably disposed proximate each stator pole;

wherein the rotatable conduit shields the toroidal stator, coil of wire, and plurality of magnets from a fluid flow passing through the rotatable conduit; and wherein the rotatable conduit comprises openings disposed around the perimeter of the rotatable conduit and the openings channel the fluid flow into the rotatable conduit.

2. The generator of claim 1, wherein the inward extending stator poles are paired with mating stator poles on opposing sides of the interior channel.

3. The generator of claim 1, wherein the inward extending stator poles are circumferentially separated by a plurality of slots.

4. The generator of claim 3, wherein the inward extending stator poles are evenly spaced by a plurality of matching slots.

5. The generator of claim 1, wherein the inward extending stator poles comprise a plurality of layers normal to the toroidal stator and evenly spaced apart from each other.

6. The generator of claim 5, wherein the plurality of layers are spaced apart by air.

7. The generator of claim 5, wherein the plurality of layers are spaced apart by potting material.

8. The generator of claim 1, wherein the coil of wire comprises a steel interior surrounded by a copper coating, further surrounded by a gold, a silver or a nickel coating.

9. The generator of claim 1, wherein the coil of wire is enclosed in PEEK.

10. The generator of claim 1, wherein the coil of wire is potted within the interior channel.

11. The generator of claim 1, wherein the plurality of magnets are permanent magnets.

12. The generator of claim 1, wherein the plurality of magnets comprise two series of magnets disposed proximate mating stator poles on opposing sides of the interior channel.

13. The generator of claim 12, wherein mating magnets of the plurality of magnets corresponding with mating stator poles comprise opposite polarity.

14. The generator of claim 1, wherein adjacent magnets of the plurality of magnets comprise opposite polarity.

15. The generator of claim 1, wherein the rotatable conduit is rotated by a turbine.

16. The generator of claim 1, wherein the openings channel the fluid flow after the fluid flow passes a turbine.

17. A method of converting rotational energy into electrical energy, comprising:
    providing a toroidal stator comprising an interior channel formed between inward extending stator poles and a coil of wire disposed within the interior channel;
    rotating a plurality of magnets disposed proximate each stator pole around a central axis shared by the toroidal stator, coil of wire and plurality of magnets; and
    channeling a drilling fluid into a rotatable conduit after the drilling fluid passes a turbine;
    wherein the rotating the plurality of magnets comprises passing the drilling fluid past the turbine that rotates the rotatable conduit that secures the plurality of magnets proximate each stator pole.

* * * * *